April 28, 1936.　　　M. J. RILEY　　　2,038,542
BOLT MACHINE
Original Filed June 4, 1932　　2 Sheets-Sheet 1
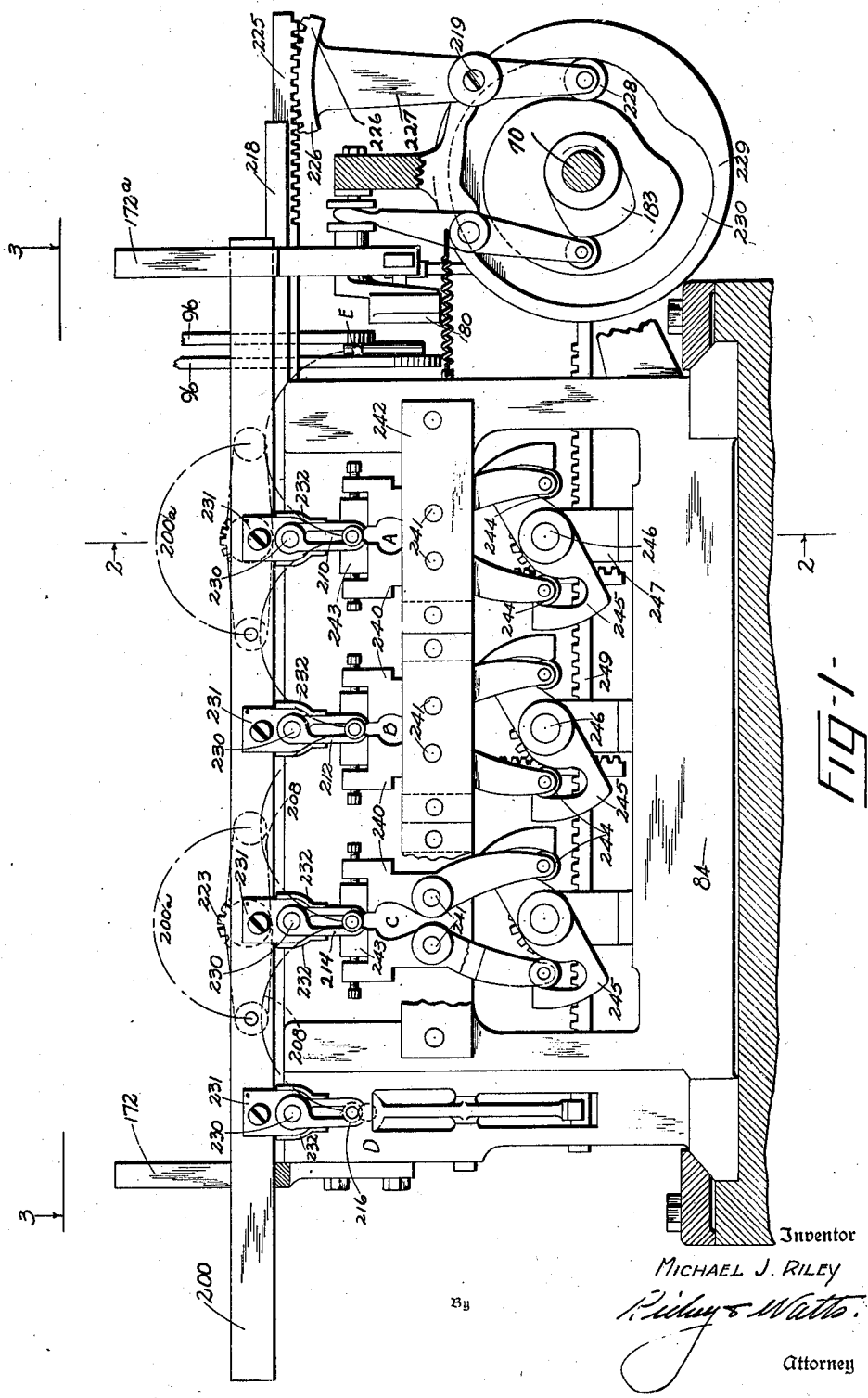
Fig-1-
Inventor
MICHAEL J. RILEY
By
Attorney April 28, 1936.  M. J. RILEY  2,038,542
BOLT MACHINE
Original Filed June 4, 1932  2 Sheets-Sheet 2
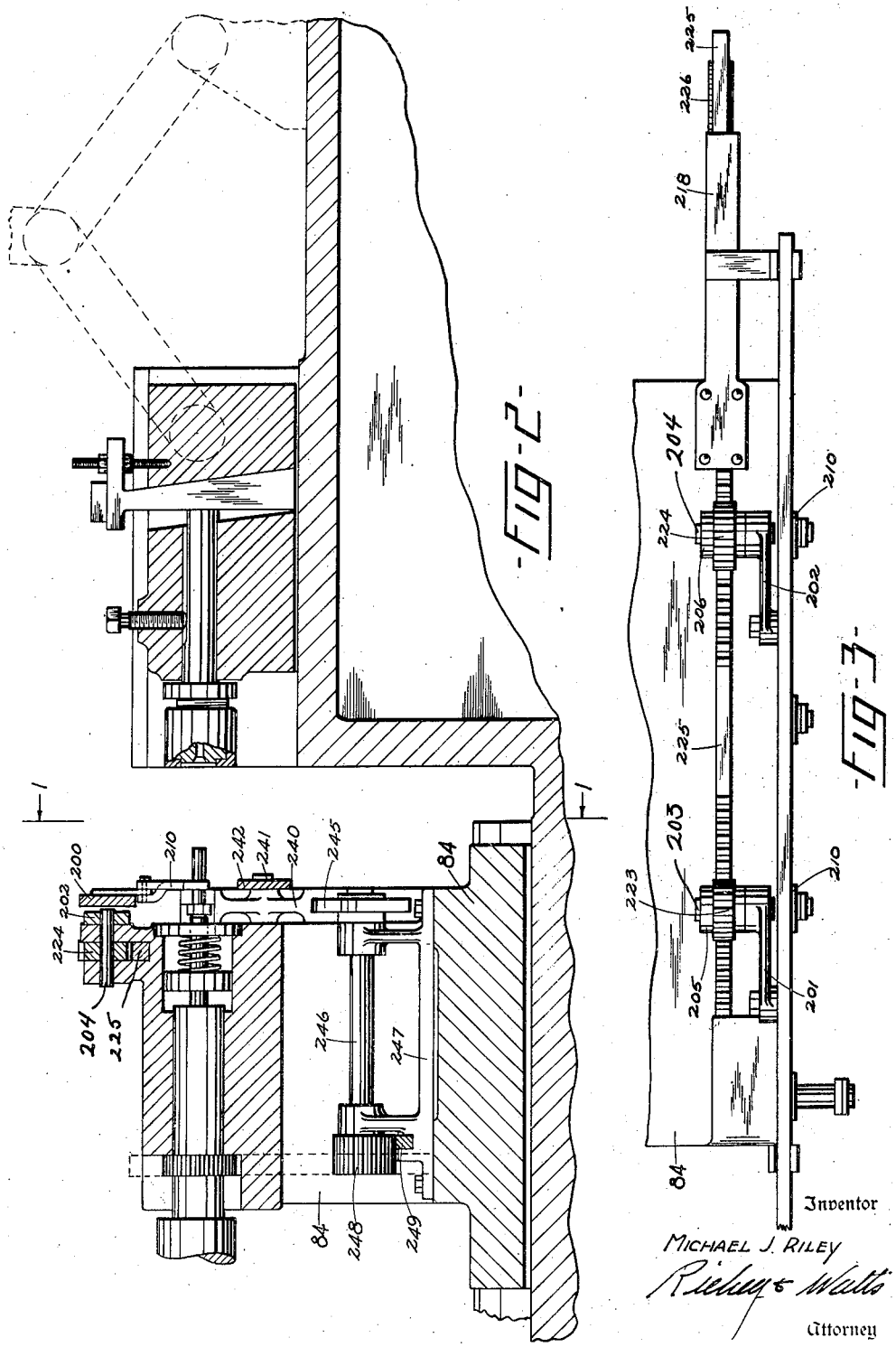
Inventor
MICHAEL J. RILEY
Attorney Patented Apr. 28, 1936

2,038,542

UNITED STATES PATENT OFFICE 2,038,542

BOLT MACHINE

Michael J. Riley, Cleveland, Ohio, assignor to The National Machinery Company, Tiffin, Ohio, a corporation of Ohio Original application June 4, 1932, Serial No. 615,368. Divided and this application February 18, 1935, Serial No. 6,945. In France May 8, 1934

13 Claims. (Cl. 10—12)

This invention pertains generally to metal working machines, and the general object thereof is the provision of an automatic machine for effecting a plurality of metal working operations simultaneously on several work blanks.

The present application is a division of my United States patent application, Serial No. 615,368, filed June 4, 1932.

A further object of my invention is the provision of such a machine and which is adapted to effect extruding, trimming, cutting and thread forming operations on screw products.

A still further object is the provision of a bolt working machine having mechanisms incorporated therein adapted to automatically feed bolt blanks to the machine and to move the blanks from station to station in said machine, whereby successive operations may be performed upon the bolt blank by other mechanisms comprising part of the machine and all operations are performed substantially simultaneously in a single machine.

A still further object of my invention is to embody mechanisms for effecting the foregoing referred to operations, which mechanisms shall be coordinated and controlled in such manner that high speed accurate production of finished work pieces may be effected.

A further object of my invention is to provide an automatic machine for extruding the thread receiving portions of the shanks of a series of bolt blanks, pointing the ends of the shanks and rolling threads upon the extruded portions, while positively maintaining the bolt blanks in the same consecutive order through each of these operations. In this way the lapse of time between any two operations on each blank of the series remains constant so as to avoid any possibility of age hardening affecting the uniformity of the product. At the same time the wear of the extrusion die during service cannot interfere with the accuracy of the threads rolled upon the shank, since as the extrusion die wears and as a consequence the portion of the shank extruded thereby becomes larger, the roll threading dies may be adjusted to maintain at all times a spacing of the roll threading dies giving the most desirable thread and avoiding any danger of making the threaded portions oval or in any way injuring the metal of the blank.

A still further object of my invention is the provision of a novel device for accurately and efficiently bodily transferring a plurality of work pieces in successive different operations on the work pieces.

Other objects of my invention will hereinafter become apparent from the description thereof and which description refers to the accompanying drawings, the drawings disclosing preferred embodiments of the invention.

In the drawings—

Figure 1 is an elevation of a portion of an automatic machine embodying the features of my invention.

Figure 2 is a transverse cross-sectional elevation taken through the machine, substantially along the plane defined by the line 2—2 of Figure 1.

Figure 3 is a fragmentary plan view of part of the mechanism shown in Figure 1 and is indicated by the line 3—3 of Figure 1.

My invention contemplates a combination of mechanisms incorporated in a single machine to effect the performance of various operations on a work piece in a completely automatic manner, whereby the work pieces may be deposited in a hopper and be selected therefrom and subsequently segregated one at a time while positioned in a raceway, whereby a single work blank is automatically horizontally positioned to be engaged by a gripper mechanism, which will transfer the work from one group of mechanisms to an adjacent group of mechanisms, and still further to a third group of mechanisms, whereby the distinctive operations of each group of mechanisms may function to perform an operation on the work piece. The association of these mechanisms to the work transferring and gripping mechanisms is such that three different operations may be simultaneously performed upon three different pieces of work or the operations may be performed on a single work piece in a successive manner. The particular operations in the instant embodiment of my invention, are adapted to perform an extruding operation on the shank end of a bolt blank, a subsequent pointing operation which points the end of the shank and finally a thread forming operation on the extruded pointed end of the blank.

The mechanisms disclosed in the drawings comprise primarily a raceway for work blanks from which segregated pieces may be permitted to escape to a positioning means, which holds the blank in a substantially vertical position from where it is swung to a horizontal position.

I also provide a work transferring mechanism in the form of a series of equidistantly spaced, simultaneously operated work gripper fingers, which, when operated progressively and intermittently, advance the bolt blank from the horizontal positioning means to a chuck associated with the extruding mechanism, which mechanism serves to reduce a portion of the bolt shank. The gripper fingers thereafter engage the bolt blank and shift it sideways to a trimming mechanism and thereafter through two successive intermittent, transverse movements of the bolt blank the bolt blank is presented to a thread rolling mechanism in an accurately positioned manner, whereupon the threads are formed on the extruded portion of the bolt blank, and the completed article is then permitted to fall into a suitable receptacle. All the foregoing referred to mechanisms have associated therewith suitable operating gears, cams, levers and shafts, arranged in such manner that all movements of the various elements of the mechanisms comprising the machine can be coordinated in timed relation, whereby accurate high speed reduction may be effected.

To present the bolt blank to the respective chucks which are associated with the extruding and trimming mechanisms, I provide four sets of depending gripper fingers, which are mounted upon a common bar 200, extending transversely of the machine above the chuck centers, whereby the sets of fingers are moved in unison. The fingers are actuated also in timed relation to the actuation of the extruding, trimming and thread rolling mechanisms and the chucks. The bar supporting the fingers is mounted upon parallel motion links, whereby any point in the bar is caused to swing through an arc of 180 degrees. The bar is guided by slotted bracket members 172 and 172a, the latter comprising part of the frame member 84 and forming stops for the bar 200 and the gripper fingers carried thereby. The center lines of the chucks and the bolt operating mechanisms are equidistantly spaced and are in a common plane with the center line of the bolt blank when the bolt blank is being horizontally supported at the bottom of the raceway bars 96 on the pedestal of the swinging arm 180.

In Figures 1, 2 and 3, the transverely disposed bar 200 is illustrated in various ways. The bar 200 (see Figs. 1 and 3), is mounted upon a pair of links 201 and 202, which are suitably supported by stud pins 203 and 204, respectively. The pins 203 and 204 are revolvably supported by bearing brackets 205 and 206, respectively, the bearing brackets being suitably attached to the top of the chuck head frame 84, adjacent the inner edge thereof, whereby a plurality of gripper fingers 210, 212, 214, and 216 may depend from the bar 200 and overhang the upper, inner face of the chuck head frame. The links 201 and 202 are swung through a movement of 180 degrees by actuation of pinions 223 and 224, suitably mounted upon the link stud pins 203 and 204, and the pinions are actuated by a rack 225, which rack is supported in a suitably formed slideway, in the top of the chuck head frame 84, and by a guide plate 218 extending outwardly from the top of the chuck head frame 84 over the cam shaft 70. The rack is reciprocated by a fan gear 226, see Figure 1, formed on the upper end of a lever 227, supported on a stud 219 carried by a suitable frame (not shown). The lower end of the lever is provided with a roller 228, which is disposed within the groove 230 of the cam member 229, the shape of the camming surface of the cam member 229 being such as to cause the fan gear 226 to impart sufficient motion to the rack 225 to cause the pinions 223 and 224 to be revolved one-half revolution, thus causing the bar 200 to be swung by the links 201, 202, as indicated by the dot and dash arcs 200a (see Figure 1) and to cause the bolt blanks carried by the fingers 210, 212, 214 and 216 to be swung through the arcs, indicated by the dot and dash lines 208. The fingers may be of the shape shown in Figure 1 and may be supported on pins 230, which pins are suitably supported by bracket members 231, the bracket members being affixed to the bar 200 in any convenient manner. Leaf spring members 232 are attached to the bracket members 231 in such manner that the lower free ends thereof may tend to keep the fingers in a closed or blank gripping position. The lower ends of the fingers are shaped to permit the spreading thereof when brought into engagement with the bolt blank shank, whereby they may be caused to slip into and out of engagement with the shank of the bolt blank by the forceful actuation of the bar 200 in opposition to the tendency of the leaf springs 232 to maintain the fingers closed.

I have provided chucks at stations A, B and C, which are adapted to firmly engage the shank of the bolt blank immediately adjacent the head of the blank, and the chuck at station A cooperates with the extruding mechanism, while the chuck at station B cooperates with the trimming mechanism to hold the bolt blanks while operations are being performed thereon. The chuck provided at station C is merely intermediate in its function and serves to hold a bolt blank while the pair of fingers 214 are being swung to the right to assume the position of the fingers 212 and to firmly hold the bolt while the fingers 216 are caused to engage the bolt blank. The position of the fingers 216 shown in Figure 1 is the position at which the bolt blank is shifted in a transverse direction to present the blank to the thread rolling mechanism. It is here desired to point out that the fingers 216 are not in transverse alignment with the other pairs of fingers but are positioned somewhat forwardly, as indicated in Figure 3, to grip the bolt blank a substantial distance away from the head of the bolt blank, and thus serve to more accurately function to guide the end of the bolt blank shank into the thread rolling dies at station D.

A description of the chuck and the actuating mechanism therefor shown at station A will suffice for the description of the chucks at stations B and C, where the mechanisms may be identical. In Figures 1 and 2 the various elements comprising the chuck and the operating elements therefor are shown. The chucks comprise pairs of opposed rockable arms 240 of substantial design and which are mounted upon horizontally disposed pins 241 supported by the chuck frame head 84 on the inner or forward vertical transverse face thereof. The forward ends of the pins 241 (see Figures 1 and 2) are supported by plate members 242, which are suitably bolted to the chuck frame head 84 in any convenient manner. The upper ends of the chuck arms 240 carry adjustable chuck blocks 243, the jaws of which are suitably shaped to conform to the shape of the work, in this instance a bolt blank shank. The lower ends of the chuck arms 240 are provided with friction rollers 244, which are engaged by rockable cam plates 245. The cam plates are mounted on stud shafts 246, suitably supported by bracket members 247, the bracket members being bolted to the chuck head frame 84. Mounted upon the studs 246 are pinions 248, which are actuated by a rack bar 249, the rack bar being suitably slidably supported in operative relation to the pinions 248 by the chuck head frame 84 and by brackets 247, whereby reciprocation of the rack bar 249 will cause slight oscillating movement of the pinions 248 and accordingly, the camming plates 245, thus causing the chuck arms to be swung open and closed. The camming plates 245 are disposed at the inner end of the stud shafts 246, while the pinions 248 and rack bar 249 are supported at the rear or outer end of the chuck head frame 84. In order to effect the operation of the chucks in timed relation to the movements of the work transferring fingers, the rack bar 249 is actuated by a suitable cam (not shown), mounted upon the shaft 70.

From the foregoing description of the chuck actuating mechanism, it will be apparent that the shape of this actuating cam and the angular disposition thereof upon the shaft 70 relative to the cam 230, predetermines the transverse blank transferring movements of the sets of fingers 210, 212, 214 and 216 in timed relation to the gripping action of the chucks.

In the operation of my apparatus one bolt blank at a time escapes from the bottom of the raceways 96 and this escapement is effected in timed relation to the other cooperating parts of the machine. The bolt positioning arm 180 then swings the bolt blank to the dotted position E shown in Figure 1 where it is ready to be grasped by fingers 210.

The four sets of fingers 210, 212, 214 and 216 are then swung simultaneously through an arc, as indicated at 208 on Figure 1, by the actuation of the bar 200, which timed movement is controlled by the relationship of the cam 230 to the came 183 which actuates the movement of arm 180 and the other cams of the apparatus. Toward the latter part of the arcuate movement of the fingers 210 from left to right of Figure 1, the lower part of the fingers 210 are brought downwardly and are forced to spread over the bolt blank as it is held in position by the bolt positioning member 180. There is a slight dwell at this point in the movement of the bar 200 and consequently in the four sets of fingers carried thereby, while the extruding, pointing and thread rolling mechanisms are completing the intended operations thereof at stations A, B and D. The bar 200 is then swung from right to left (Figure 1) and the bolt blank, which has been picked up by fingers 210, is presented to the first set of chuck jaws at station A. A repetition of the foregoing movements then causes the bolt blank to remain at station A, while the fingers 210 swing from left to right to pick up another bolt. In the meantime, the fingers 212 will have engaged the bolt blank remaining at station A and transfer this bolt blank to station B. The chucks are synchronized in their movement with the movements of the fingers whereby the chuck jaws will never be completely open when the fingers are swinging. A second repetition of the foregoing operations will cause the fingers 214 to transfer the first bolt blank to station C and, as will be obvious, in the meantime the following bolt blanks will be positioned in the chuck jaws at stations A and B. No operation is performed upon the bolt blank at station C. It is there held by the chuck jaws until the forwardly positioned fingers 216 come into engagement with the bolt blank toward the outer extruded end of the bolt blank. A still further cycle of operations will then position the first bolt blank at station D where the thread rolling operation takes place.

It will be seen that the movement of the bar 200 and of the blank gripping fingers carried thereby will be limited by the members 172 and 172a. These members are slotted and guide the movement of the bar 200 as it swings through its arcuate path and the bottoms of the slots in the members 172 and 172a are so disposed that they will provide stops or abutments limiting the downward movement of the bar 200 and its fingers so that the bolt blanks will be properly positioned to be gripped in the chucks.

The links or crank arms 201 and 202 which support the bar 200 are both actuated by the rack 225 and are, therefore, either in alignment or parallel at all points in their movement. This results in the bar 200 being always maintained in a horizontal position and providing a parallel movement of the four sets of fingers 210, 212, 214 and 216.

It will be understood that in this application, which is a division of my copending application, Serial No. 615,368, only the mechanism directly connected with the transfer apparatus and its associated parts is illustrated and described and reference is made to my said copending application for further illustration and description of the entire mechanism making up my improved metal working machine.

From the foregoing description of my invention it will be apparent to those skilled in the art that I provide in a composite machine groups of coordinated mechanisms, which are adapted to effect the simultaneous performance of operations on work pieces, that my machine is adapted to perform a variety of operations upon a piece of work and that the machine is adaptable to various sizes of work. It will also be apparent to those skilled in the art that my improved mechanism for transferring a piece of work from one station to another is also adaptable to various other uses in the metal working arts. Although I have described the illustrated embodiments of my invention in considerable detail it will be understood by those skilled in the art that modifications and variations may be made without departing from the spirit of my invention. I do not, therefore, wish to be limited to the specific embodiments shown and described but claim as my invention all embodiments coming within the scope of the appended claims.

I claim:

1. In combination, a plurality of work stations, means for feeding blanks to the first of said work stations and a transfer mechanism for carrying blanks to each of the stations in sequence comprising a support carrying blank gripping means, said support being journalled at spaced points upon a pair of eccentrically rotatable members and means for actuating said support.

2. In combination, a plurality of spaced work stations, means for feeding blanks to the first of said stations and transfer mechanism for transferring blanks to each of said stations in sequence comprising a support carrying a plurality of sets of blank gripping fingers, a pair of spaced parallel cranks upon which said support is journalled, and means for simultaneously oscillating said cranks.

3. In a bolt making machine, in combination, a pair of tools to receive blanks, and transfer mechanism for carrying blanks from the first tool to the second including gripping fingers to grip a blank and means for moving said fingers alternately in opposite directions through a path forming a semi-circle with the ends of the path positioned on the axes of said tools.

4. In combination, a plurality of work stations, means for feeding blanks to the first of said work stations and a transfer mechanism for carrying said blanks to each of the stations in sequence, said transfer mechanism including a support, a plurality of pairs of blank gripping fingers carried by said support, all of said pairs of fingers being adapted to travel in parallel paths during movement of said support, and means for moving said support whereby all points thereon travel in an arcuate path.

5. In combination, a plurality of work stations, means for feeding blanks to the first of said work stations and a transfer mechanism for carrying said blanks to each of the stations in sequence, said transfer mechanism including a support, a plurality of pairs of blank gripping fingers carried by said support, all of said pairs of fingers being adapted to travel in parallel paths during movement of said support, means for moving said support whereby all points thereon travel in an arcuate path, and means for limiting the movement of said support.

6. In combination, a plurality of work stations, means for feeding blanks to the first of said work stations and a transfer mechanism for carrying said blanks to each of the stations in sequence, said transfer mechanism including a support, a plurality of pairs of blank gripping fingers carried by said support, all of said pairs of fingers being adapted to travel in parallel paths during movement of said support, means for moving said support whereby all points thereon travel in an arcuate path, and means, independent of said support moving means, for limiting the movement of said support.

7. In combination, a plurality of spaced work stations, means for feeding blanks to the first of said work stations and a transfer mechanism for carrying blanks to each of the stations in sequence comprising a support carrying blank gripping means, means for moving said support whereby blanks will be transferred successively from station to station, and means, independent of said support moving means, for limiting the movement of said support and the blank gripping means carried thereby.

8. In combination, a plurality of work stations comprising means for holding blanks while work is being performed thereon, means for simultaneously performing work on the blanks held at said work stations, and transfer means for carrying blanks successively from station to station, said transfer means comprising a support carrying blank gripping means, said support being journalled at spaced points upon a pair of rotatable cranks, and means for simultaneously rotating said cranks.

9. In combination, a plurality of work stations comprising means for holding blanks while work is being performed thereon, means for simultaneously performing work on the blanks held at said work stations, and transfer means for carrying blanks successively from station to station, said transfer mechanism including a support, a plurality of pairs of blank gripping fingers carried by said support, all of said pairs of fingers being adapted to travel in parallel paths during movement of said support, and means for moving said support whereby all points thereon travel in an arcuate path.

10. In combination, a plurality of work stations comprising means for holding blanks while work is being performed thereon, means for simultaneously performing work on the blanks held at said work stations, and transfer means for carrying blanks successively from station to station, said transfer mechanism including a support, a plurality of pairs of blank gripping fingers carried by said support, all of said pairs of fingers being adapted to travel in parallel paths during movement of said support, means for moving said support whereby all points thereon travel in an arcuate path, and means for limiting the movement of said support.

11. In combination, a plurality of work stations comprising means for holding blanks while work is being performed thereon, means for simultaneously performing work on the blanks held at said work stations, and transfer means for carrying blanks successively from station to station, said transfer mechanism including a support, a plurality of pairs of blank gripping fingers carried by said support, all of said pairs of fingers being adapted to travel in parallel paths during movement of said support, means for moving said support to effect transfer of the blanks, and means, independent of said support moving means, for limiting the movement of said support.

12. In a machine for making bolts, in combination, a frame having a plurality of tools arranged in a straight line, a reciprocating working slide having a plurality of tools arranged to cooperate with said frame tools, a transfer mechanism including a support pivoted to a pair of spaced cranks arranged on one side of the line of said tools and carrying pairs of spring fingers extending toward and substantially perpendicular to the said line of tools and means for swinging said support on said pair of spaced cranks in timed relation to the operation of the header slide.

13. In a machine for making bolts, in combination, a frame having a plurality of tools to successively perform different fabricating operations upon bolt blanks, a reciprocating working slide having a series of tools arranged to co-operate with said plurality of frame tools, one of said tools comprising an extrusion die for reducing the shank diameter of a bolt blank and a transfer mechanism arranged to move a bolt blank from said extrusion die subsequent to its working therein to the next adjacent pair of cooperating tools comprising a support pivoted to a pair of spaced cranks arranged on one side of the line of tools, said support provided with pairs of spring fingers extending toward and substantially perpendicular to the line of said tools, and means for swinging said support on said pair of spaced cranks in timed relation to the operation of the header slide including means for compelling said two cranks to move in unison.

MICHAEL J. RILEY.